Jan. 20, 1970   R. D. WIGHT ET AL   3,490,255
VEHICLE CONTROL LOCKING SYSTEM
Filed Dec. 19, 1967   3 Sheets-Sheet 1

INVENTORS.
Robert D. Wight,
Edward G. Curtindale,
Dan R. Kimberlin,
Floyd A. Schluckebier,
& Philip A. Seidel
BY D. L. Ellis
ATTORNEY Jan. 20, 1970  R. D. WIGHT ET AL  3,490,255

VEHICLE CONTROL LOCKING SYSTEM

Filed Dec. 19, 1967  3 Sheets-Sheet 2

INVENTORS.
Robert D. Wight,
Edward G. Curtindale,
Dan R. Kimberlin,
Floyd A. Schluckebier,
& Philip A. Seidel
BY
D. L. Ellis
ATTORNEY

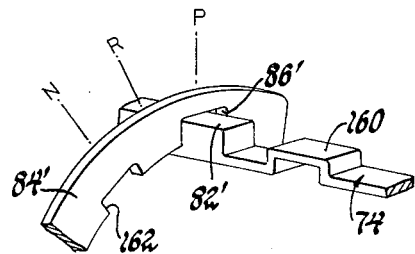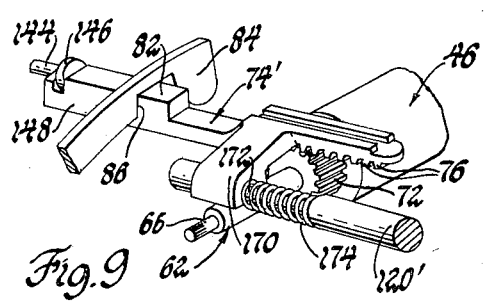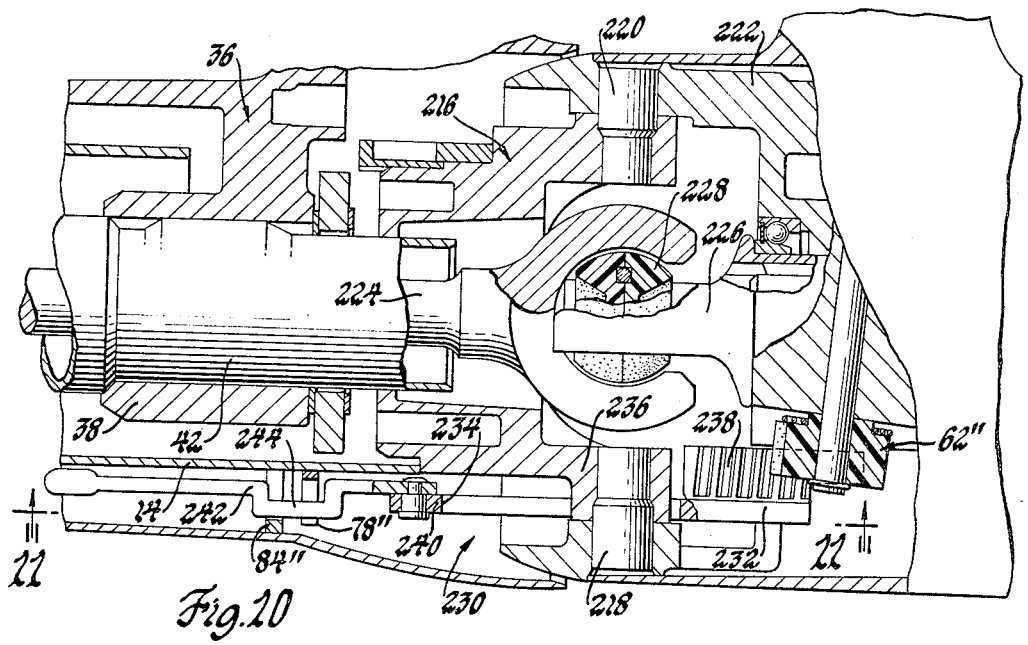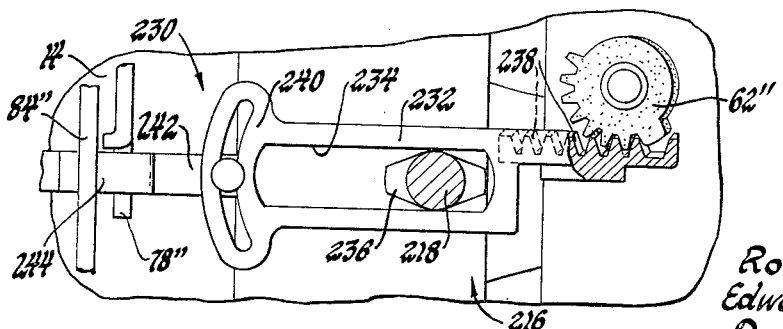

United States Patent Office 3,490,255
Patented Jan. 20, 1970

3,490,255
VEHICLE CONTROL LOCKING SYSTEM
Robert D. Wight, Edward G. Curtindale, and Dan R. Kimberlin, Saginaw, Floyd A. Schluckebier, Frankenmuth, and Philip A. Seidel, Saginaw, Mich., assignors to General Motors Corporation, Detroit, Mich., a corporation of Delaware
Filed Dec. 19, 1967, Ser. No. 691,817
Int. Cl. B60r 25/02, 25/06; E05b 65/12
U.S. Cl. 70—252                                    7 Claims

ABSTRACT OF THE DISCLOSURE

A coincidental lock for an automotive vehicle steering column assembly includes a lock bolt for a rotatable transmission selector tube within the column and a bolt for the rotatable steering shaft within the column, both bolts being reciprocable generally in directions parallel the steering column axis between locked position registered within openings in keeper plates on the transmission selector tube and on the steering shaft and an unlocked position out of registry therewith. Both bolts are controlled by a key-operated cylinder lock mounted on the steering column, and the cylinder lock is operable for control of the vehicle starting and ignition system through connection between one of the bolts and an ignition switch mounted on the column so that reciprocation of the former operates the latter. The locking bolts are movable to locked position by the cylinder lock only when the transmission selector tube is located in a predetermined position corresponding to an inoperative condition of the vehicle transmission. The bolts are prevented from being locked in all other conditions of the vehicle transmission.

SPECIFICATION

This invention relates generally to automotive vehicle locks and more particularly to an improved coincidental steering, transmission and ignition lock system for automotive vehicles.

Yet more specifically, this invention contemplates marked improvements in providing a locking arrangement for automotive vehicle steering column assemblies having a steering component and a component for manually selecting the various operating ranges of the vehicle power transmission. The elements of the inventive steering column lock are all mounted on the vehicle steering column structure itself for operation by key-controlled cylinder lock means or the like to coincidentally lock or unlock both the steering shaft and the transmission selector, as well as control the vehicle ignition, engine starter, and other vital switch components of the vehicle electrical system.

One feature of this invention is that it provides an improved steering column lock of compact and simplified construction wherein various locking elements for the vehicle steering, transmission and ignition controls, and the manual cylinder lock or similar actuating element therefor are all mounted directly within the steering column structure of the vehicle.

Another feature of this invention resides in an arrangement of steering column locking bolt means for the vehicle steering and transmission components mounted for reciprocating movement between locked and unlocked conditions in planes extending generally longitudinally of the steering column for registry with rotatable lock keepers on the steering shaft and transmission selector.

A further feature of this invention resides in the use of distinct such longitudinally shiftable lock bolts for each of the steering and transmission selector components of the column, the bolts being coordinated for simultaneous actuation between lock and unlocked conditions by a single cylinder lock or like manual control and locking member.

Another feature of the invention resides in the use of a gate and stop gating arrangement between the lock bolts and the keepers operative to allow locking of the vehicle controls only in a predetermined condition of the vehicle power transmission, the gating arrangement preventing such locking of the transmission selector and the steering shaft, and locking of the vehicle ignition system, until the transmission selector is placed in a corresponding such predetermined position.

Yet another feature of this invention is concerned with the location of the vehicle ignition and starter motor switches directly on the steering column structure for operation thereof through connection between the switch elements and a steering column lock bolt which is in turn connected with the key-operated cylinder lock or like manual control.

Certain other features of the invention relate to the high degree of security provided in the steering column lock structure against defeat thereof by unauthorized tampering, forcing, breaking, etc.

These and various other features and advantages of the invention will be readily apparent from the following specification and drawings wherein:

FIGURE 8 is a perspective view showing a modification of a steering column lock structure according to the invention;

FIGURE 9 is a fragmentary perspective view showing a further modification of the invention;

FIGURE 10 is a sectional view similar to FIGURE 2 showing a modification of the invention as applied for use in a tiltable wheel steering column; and FIGURE 11 is an elevational view taken generally along the plane indicated by lines 11—11 of FIGURE 10.

Figure 1:
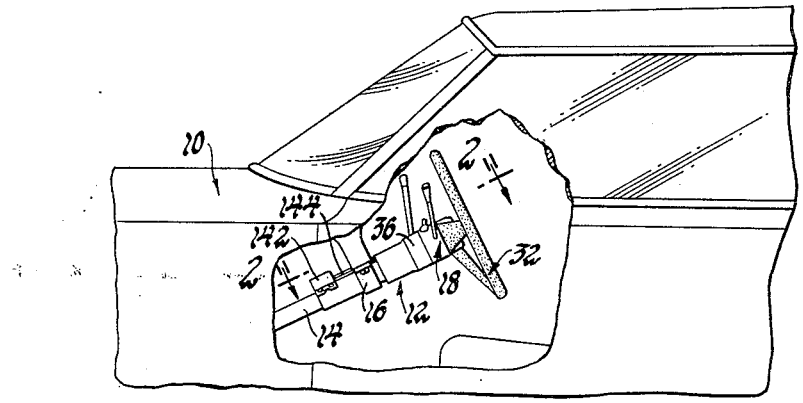
FIGURE 1 is a fragmentary partially broken away elevational view of an automotive vehicle body including a steering column and a steering column lock structure therefor according to this invention.

Referring now particularly to FIGURE 1 of the drawings, a vehicle body 10 includes a steering column assembly 12 mounted in the forward passenger compartment and extending through the body firewall to the vehicle engine compartment, not shown. The steering column structure, as conventional, includes a supporting outer column or tube structure mounted on the body 10 by means of a bracket 16 on the instrument panel structure of the body and additionally by a similar bracket or fastening on the firewall structure of the body. The support column contains therewithin and rotatably mounts upon the vehicle body certain of the various operating elements for the vehicle, including the vehicle steering shaft and a rotatable power transmission range selector tube to be described below.

Figure 2:
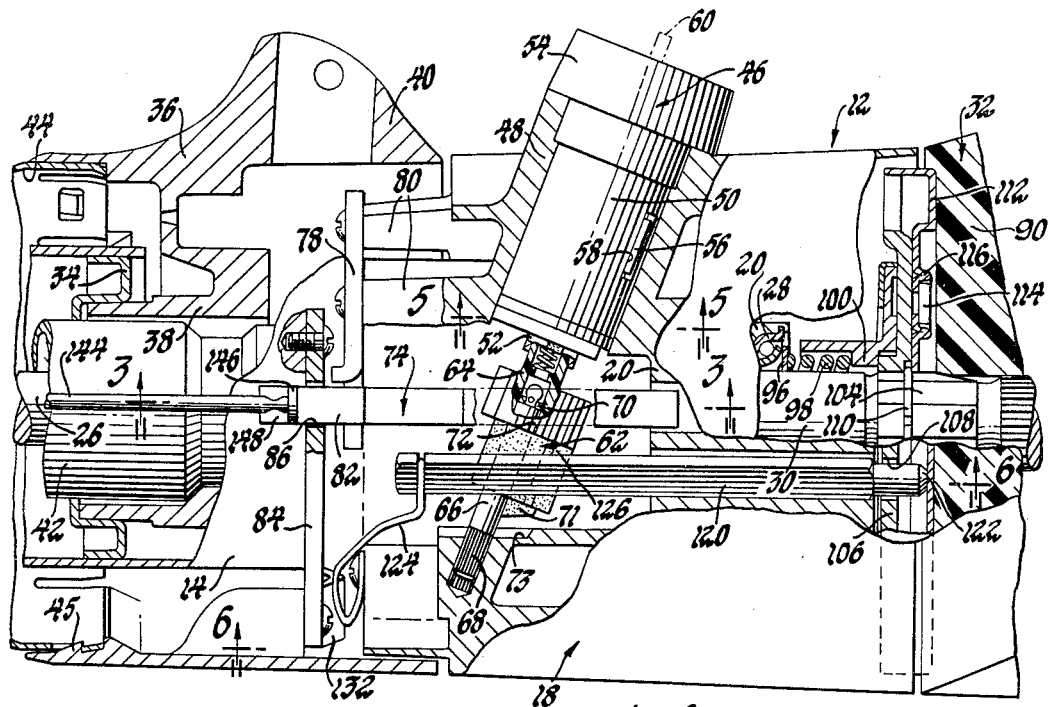
FIGURE 2 is an enlarged partially broken away view taken generally along the plane indicated by lines 2—2 of FIGURE 1.
Figure 6:
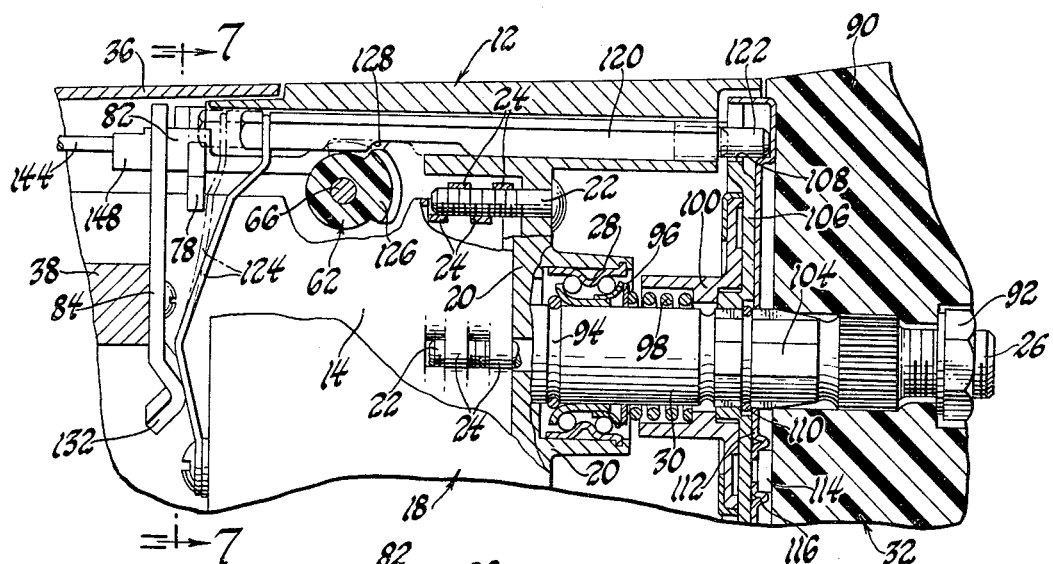
FIGURE 6 is a sectional view taken generally along the lines 6—6 of FIGURE 2.

Referring to FIGURES 2 and 6, the support column 14 is provided with a stationary decorative housing 18 for containing the steering column lock of this invention and additionally the conventional turn signal mechanism, not shown. The housing 18 is typically of die-cast construction and includes an outer annular decorative portion merged with a hub located generally centrally of the column. Such hub, designated 20 and seen best in FIGURE 6, seats directly on the upper end of the support column 14 and is secured thereto by a number of self-tapping sheet metal screws 22 or the like at locations around the hub tapped and screwed within recesses each formed directly out of the sheet thickness of the support column by lancing therein an axial series of loops 24 projecting radially inward and alternately outward of the support column wall. The screws 22 are preferably of the "no-back" variety; that is, are set into the support column with special tools and have no head slots suitable for removal by conventional screwdrivers or the like.

Referring to FIGURE 2, housing 18 serves to rotatably mount the upper end portions of the vehicle steering shaft assembly, designated 26, which extends through the support column 14 generally centrally thereof to have connection at its lower or forward end with the vehicle steering gear. The upper rotational mounting is provided by a bearing 28 seated on the housing 18 and directly above which is the usual splined end portion 30 of the steering shaft connectible with the hub of the vehicle steering wheel 32. A similar bearing, not shown, may be provided adjacent the lower end of support column 14 to rotatably mount the steering shaft 26. Immediately below housing 18, the support column 14 mounts a bearing cup 34 having an annular recessed portion for rotatably receiving the lower extremity of the hub 38 of the vehicle transmission selector or shift bowl 36. The bowl, again, is typically die-cast and includes an outer decorative annular portion merged with the bowl hub and generally contiguous with the outer surface of the housing 18, with a mounting portion 40 being provided for the usual shift lever, FIGURE 1. Fixed to the hub 38 of the shift bowl by splines or the like is the upper end of the conventional shift tube 42 extending downwardly through the support column 14 generally concentrically about the steering shaft 26 for connection with the transmission at a point below the firewall of the body 10. Again, suitable bearing means may be provided adjacent the lower portion of support column 14 for the shift tube 42. A shroud 44 is secured to the shift bowl 36 by a tab and slot construction 45 and extends toward the vehicle instrument panel for decorative covering of the adjacent support column areas.

Referring now specifiaclly to the steering column lock system of this invention, the same includes a cylinder lock actuator, designated generally as 46, fixed within a decorative boss 48 of the stationary housing 18. The lock 46 is of generally conventional construction including a casing or sleeve 50 nonrotatably secured by a key and way structure within the boss portion 48, and an inner plug or core indicated at 52 and having a decorative outer finger manipulating head 54. The cylinder lock preferably includes tumbler construction of the so-called "side bar" type, the side bar being indicated at 56 and shown received within a locking slot 58 of the casing in well-known manner. Cylinder lock 46 operates under insertion of a suitably coded key, indicated as 60 in FIGURE 2, to withdraw the side bar 56 from the locking slot 58 to facilitate actuating rotation of the core 52 within casing 50. Only upon return rotation of the core 52 to a locking position aligning the side bar 56 with the slot may key 60 be withdrawn, whereby the side bar is caused to again extend into the slot to lock the core against rotation from such locked position.

The inner end of the core 52 of the cylinder lock is provided with a splined or similar drive connection with a hub portion 64 of an actuating sector member 62. The sector 62 is further rotatably mounted on stationary housing 18 by a shaft 66 received rotatably within the sector and press-fitted at its end 68 into a bore of the housing. The lock cylinder casing 50 has the normal provisions against forced axial displacement from its installed position within housing 18, but assuming sufficient extreme force is exerted to break the casing 50 axially inwardly from the housing mounting boss 48, the sector 62 is movable with the lock cylinder axially inwardly of the housing through shearing of an annular shoulder 70 in the bore of the sector which normally seats on the round-headed end of the shaft 66. In the event of such inward forcing while the core 52 is in locked position, a lug 71 on the sector enters a slot 73 in housing 18 to hold the sector and lock cylinder against actuating rotation.

Figure 3:
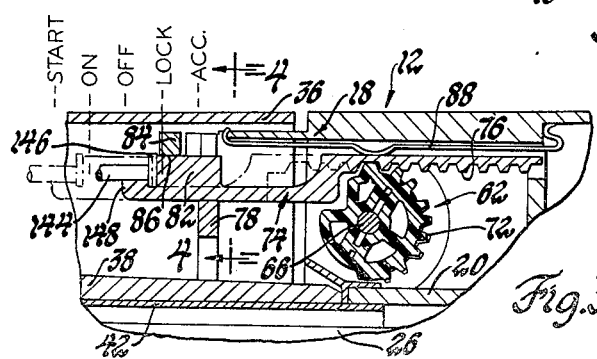
FIGURE 3 is a sectional view taken generally along the plane indicated by lines 3—3 of FIGURE 2.

In the normal secure installed position of the sector 62 within the housing as shown in FIGURE 2, a series of actuating gear teeth 72 formed on a portion thereof is meshingly engaged with a toothed rack portion 76 of a shift bowl locking bolt member 74, seen best in FIGURE 3. The lock bolt 74 is mounted for reciprocatory movement within a recess of housing 18 through support at its one rack 76 end on the sector and by slidable support within a slot of a plate 78 mounted on projecting bosses 80 of the housing 18, FIGURE 2. The sides of the supporting slot in plate 78, seen best in FIGURE 4, securely holds the lock bolt 74 against any forces to move the lock bolt transversely of the steering column.

Figure 4:
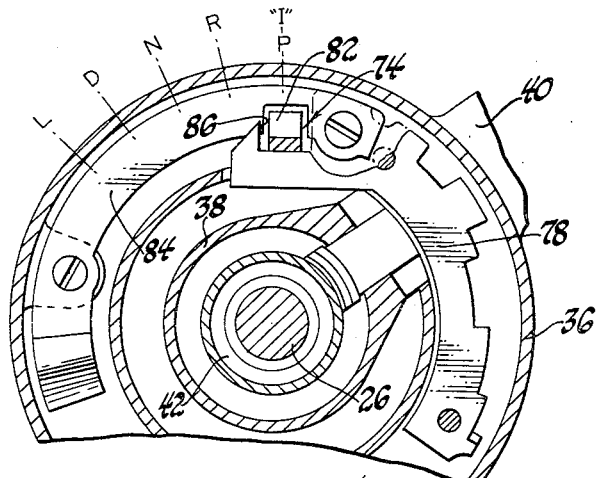
FIGURE 4 is a sectional view taken generally along the plane indicated by lines 4—4 of FIGURE 3.

Referring to FIGURE 3, lock bolt 74 includes an enlarged or raised stop portion 82 which reciprocates axially of the column between registry and nonregistry positions within and out of a slotted keeper plate 84 which is secured by screws to bosses on the shift bowl 36, seen best in FIGURE 4. The slot or gate 86 of the keeper plate 84 is alignable in a predetermined position rotatively of the support column with the slot in plate 78 and thus with the directional travel plane of the lock bolt 74. Reverting to FIGURE 3, the lock bolt 74 is there shown in a locked position aligning the stop 82 in registry within the slot 86 of keeper 84 thereby to block rotation of the shift bowl 36 from the position shown relative to plate 78 and housing 18. Upon reciprocation of lock bolt 74 in a downward direction by sector 62 to the position shown in dotted lines, the stop 82 is removed from registry with slot 86 thereby permitting rotation of the shift bowl and the shift tube 42 to normally control the vehicle power transmission ranges. The lock bolt 74 is quite freely reciprocable between these positions within housing 18, with a preloading convoluted spring 88 being seated between the housing and the lock bolt to properly load the rack teeth 76 on the teeth of sector 62.

Referring to FIGURES 2 and 6, it is seen that the hub 90 of the steering wheel 32 is received on the splined end 30 of the steering shaft 26 and held by a nut 92 threaded thereon. The bearing 28 rotably mounting the steering shaft 26 on housing 18 is securely mounted in the latter by seating on a snap ring 94 on the shaft at one side, the other side of the bearing outer race being held by staking the outer annular edge of the hub 20 thereover. At the upper side of the bearing, a washer 96 seats thereon and in turn seats one end of a relatively strong compression coil spring 98 bearing at its other end on an annular flange of a turn signal cancelling member 100, the conventional functions of which are well understood in the art and form no part of this invention. Mounted immediately thereabove on the steering shaft as by a splined connection 104 is a steering shaft keeper plate 106 of generally circular shape and having formed in its outer periphery an equally spaced array of bolt receiving notches 108. The keeper plate is retained on the steering shaft splines 104 axially thereof by a snap ring 110 seated within a recess of the keeper plate and within a groove in the shaft end 30. A keeper cover plate 112 is mounted directly over keeper plate 106 and fits at its central aperture closely against the steering shaft end 30 to hide the snap ring 110 from unauthorized tampering or removal by conventional tools. A number of screws 114 of the "no-back" variety secure the cover plate to the keeper plate 106, the heads of the screws 114 being received within depressions formed by annular lips 116 around the screw receiving bores. The lips inhibit unauthorized removal of screws 114 as by chiselling of the heads from the shanks thereof. The snap ring 110 securely holds the keeper plate 106 and the cancel member 100 axially on the steering shaft end 30 against installed compression in spring 98. Even assuming that unauthorized operations are accomplished to remove the cover plate 112, it is seen that the force of the compression spring provides significant deterrent to removal of the snap ring 110 in attempts to remove the keeper plate 106 and the cancel member 100 from the shaft end.

Figure 7:
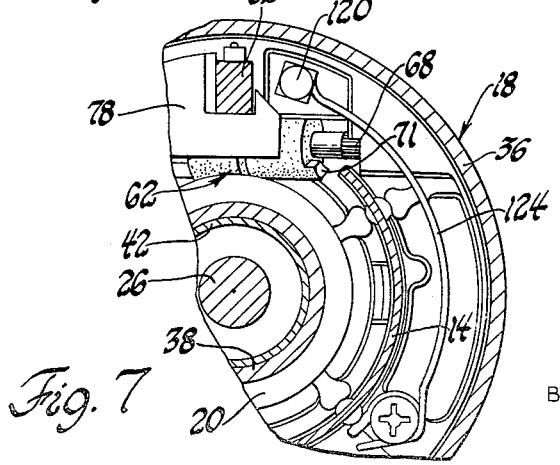
FIGURE 7 is a view taken generally along the plane indicated by line 7—7 of FIGURE 6.

An elongated steering shaft lock bolt 120 is slidably mounted in a close bore of housing 18 and includes a reduced rounded end 122 receivable upon projection of the lock bolt into its locked position, shown in FIGURES 2 ond 6 in solid lines, to be received in any of the several keeper plate notches 108. Such registry of end 122 firmly locks the keeper plate 106 and the steering shaft 26 against rotation relative to housing 18. The opposite or inner end of bolt 120 is suitably grooved to have hooked thereover the free end of a cantilever leaf spring 124. As also seen in FIGURE 7, the other end of the spring is mounted by a screw or the like to the housing 18. As indicated in dotted lines in FIGURE 6, the spring 124 is formed to assume a relaxed position wherein it locates the lock bolt 120 in an unlocked or withdrawn position in housing 18 relative to keeper plate 106.

The location of shaft bolt 120 in its locked or unlocked positions is controlled by manipulation of the cylinder lock 46 through means of a cam formation 126 on sector 62 immediately adjacent the teeth thereof, seen best in FIGURE 6, the cam 126 cooperating with a shoulder 128 formed in the bolt 120. Further cooperating with this cam to control the positions of bolt 120 is a cam projection 132 on the shift tube keeper member 84. As mentioned, this keeper plate is rotatable with the shift bowl 36 during control of the ranges of the vehicle power transmission, and the cam projection 132 is so located as to engage spring 124 generally only when the shift bowl and shift tube 42 are located in the position shown in FIGURES 2 and 6 corresponding to a "Park" range of on automatic transmission or, for example, "Reverse" in a manual transmission. Such engagement of the cam with the spring stresses the latter toward a resiliently deformed position wherein the spring seeks to locate bolt 120 in the locking position as shown, all of which is shown in solid lines in FIGURES 2 and 6. Assuming that the shift bowl and tube have been so located in "Park" or a similar position, and that subsequently the lock cylinder 46 is manipulated to move the core thereof to its locked position shown in FIGURE 2, the sector 62 is moved accordingly to locate the cam 126 in the position shown in solid lines in FIGURE 6. In this position, the lobe of the cam is removed from interference with the shoulder 128 of lock bolt 120 so that the latter moves freely to its locked position under the stress that has been provided on spring 124 by the cam projection 132. If the cylinder lock 46 has not been so placed in locked position, but is left in unlocked position after the shift bowl has been located in "Park", the cam 126 assumes generally the position shown in broken lines in FIGURE 6 wherein the lobe thereof engages the shoulder 128 to prevent movement of the bolt 120 under the aforementioned stress in spring 124. Accordingly, the spring assumes a bowed shape over cam projection 132 ready to bias the bolt to locked position when the cam is removed from engagement with shoulder 128.

Assuming that it is now desired to move the steering shaft bolt 120 to unlocked position and that the various parts are initially all in the locked and corresponding positions just described and shown in solid lines in FIGURE 6, the operator's first manipulation is to actuate cylinder lock 46 after insertion of its coded key to move it from locked to the unlocked position. Such movement rotates cam 126 from the solid to the broken line position thereof causing the edge of the cam to pick up shoulder 128 and positively move the bolt inwardly with the end of spring 124 to unlocked position, shown in broken lines. This, of course, again bows the spring 124 to its stressed condition with the end of the spring being generally as shown in broken lines, and when the shift bowl 36 is subsequently rotated from its "Park" position to any of the various operative ranges of the transmission by clockwise rotation, viewed in FIGURE 4, the cam projection 132 is thereby removed from engagement with the spring 124 and all stress or bow therein is removed so that the lock bolt 120 cannot be inadvertently moved again to locked position by accidental or unintentional manipulation of the cylinder lock 46 toward locked condition.

Figure 5:
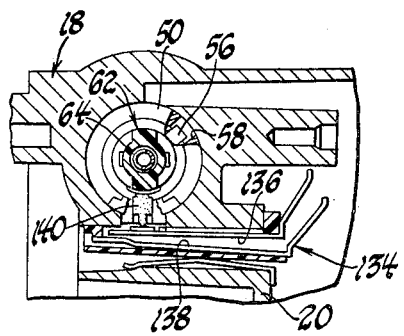
FIGURE 5 is a sectional view taken generally along the plane indicated by lines 5—5 of FIGURE 2.

It will be understood that if the necessary operations are accomplished as above to move bolt 120 to locked position, but the steering shaft 26 and keeper plate 106 are located in such a rotary position that none of its several locking notches 108 are in true rotary alignment with the longitudinal plane of the bolt such that the latter is blocked, then a slight rotation on the steering wheel, whether authorized or unauthorized, will bring one of such notches 108 into the required alignment whereby the bowed or stressed spring 124 will automatically snap the bolt 120 upwardly to locked position within the notch Referring to FIGURE 5, housing 18 receives within a cavity thereof adjacent the cavity for cylinder lock 46, a buzzer switch 134 forming a part of the buzzer warning system found on cars manufactured by the assignee of the present invention. This system includes a circuit having switch 134 in series with the conventional door jamb switch controlling the vehicle dome light or other interior lights. Switch 134 includes a pair of cantilever blades 136 and 138 having terminal end portions extending above the housing cavity for engagement with brush contacts on the turn signal cluster, not shown, thence to the door jamb switch through suitable wiring. Blade 136 is normally open from blade 138 and is closed to contact therewith upon projection and engagement by a radially movable plunger 140 in the cylinder lock 46 responsive to insertion of the key therein. With the key so inserted, switch 134 is closed to complete a circuit to the vehicle horn relay when, in addition, the door jamb switch is in a circuit closing position corresponding to an open position of the driver's door.

Reverting to FIGURES 1 and 2, the vehicle electrical system components for the engine ignition and engine starting, and accessory circuits are also controlled by the steering column lock of this invention. A switch structure 142, not shown in detail, is suitably mounted on support column 14 below bracket 16. This switch structure may be of any suitable construction wherein reciprocating movement of an actuating element thereof to a number of shifted positions relative to its surrounding housing and contact structure will close selected switch contacts for selected respective ones of the vehicle electrical circuits. For example, vehicles manufactured by the assignee herein have typically included electrical switch structure of integral design controlling the vehicle ignition by movement of the switch between "on" and "off" positions, as well as the vehicle engine starter system by closing of respective switch contacts in a "start" position, and additionally controlling certain other of the vehicle circuits in an "accessory" position. These various switch elements of switch 142 are controlled in the instant structure by having a slidable actuator thereof mounted to a switch actuating rod 144 extending from switch 142 upwardly along the column slidably relative thereto to connect with the shift tube lock bolt 74. As seen in FIGURES 2 and 3, the upper end of the rod 144 has a head 146 lying adjacent and a portion of the cylindrical shank of the rod lying within a slot of a connector end 148 of such lock bolt. The end 148 has staking thereon over the rod and the head 146 is trapped between the connector end and the stop 82 of lock bolt 74 to provide firm axial connection between the rod and the shift bolt to accomplish positive control of the switch assembly 142 by sliding movement of the actuating element thereof through movement of the lock bolt 74 over its range of locking and unlocking positions, as will be described, under selected manual rotation of cylinder lock 46.

OPERATION

In vehicles produced by the assignee of this invention, the automatic transmission selector typically includes several ranges for the transmission such as "Park," located at one extreme end of the selection range, and then in order of successive rotative positions "Reverse," "Neutral," "Drive" and "Low" ranges such as indicated in FIGURE 4 showing the reference positions of the shift bowl 36 relative to a longitudinal index plane on the support column indicated "I." Similar reference conditions of the shift bowl and shift tube structure for a manual transmission selector are believed to follow clearly from the subsequent description and will not be described. As will be noted in FIGURE 4, the gate 86 in keeper plate 84 on shift bowl 36 is located to align with the slot in plate 78 in the "Park" position of the shift bowl.

Referring to FIGURES 2 and 3, the cylinder lock 46 has the core 52 thereof rotatable counterclockwise in a range from a "lock" position corresponding to the position of the parts shown in FIGURE 3 in solid lines, toward a position of the parts designated as "on" in FIGURE 3 shown in broken lines and corresponding to a position of the actuator element of switch assembly 142 wherein the ignition circuit is completed. These conditions of the cylinder lock 46 are indicated with respect to the corresponding locations of lock bolt 74 as controlled by the rack 76 and sector 62. In addition, the cylinder lock 46 and the lock bolt 74 are locatable in "accessory" position displaced slightly clockwise and rightwardly respectively from the solid line position shown. Also, it is contemplated that these parts assume a "start" position wherein the lock bolt 74 is located slightly leftwardly of the broken line "on" position with the sector 62 correspondingly located, such "start" and "accessory" positions describing the limits of the travel range of the cylinder lock core 52.

To describe now a normal operating sequence, the shift tube lock bolt 74 is assumed located in "lock" position registering stop 82 in gate 86 of keeper 84 when the shift bowl is in "Park" to lock it therein. From this position, the key for cylinder lock 46 is inserted whereby the latter may be actuated slightly counterclockwise to move the sector 62 and lock bolt 74 to "accessory" position to pull switch rod 144 upwardly and condition switch 142 for closure of various selected vehicle accessory circuits in conventional manner. In both this position and in "lock" position, not only is the shift bolt 74 registered within gate slot 86 but, as previously described, steering shaft lock bolt 120 is biased to be located in its locked position, FIGURE 6. To unlock the steering column, cylinder lock 46 is rotated to move sector 62 counterclockwise, FIGURE 3, moving lock bolt 74 leftwardly to an "off" position wherein stop 82 is removed just out of registry with gate 86. Concurrently, cam 126 engages the shoulder 128 on the steering shaft lock bolt 120 and moves it to unlocked position. In this condition of the parts, the steering shaft 26 and the shift bowl and shift tube 36 and 42 are free to rotate within support column 14, with the switch assembly 142 being in a condition of non-energization of the vehicle ignition circuit. The cylinder lock 46 may then be further actuated counterclockwise to move lock bolt 74 and switch rod 144 further leftwardly to the "on" and sequentially the "start" position energizing the vehicle ignition circuit and then the vehicle engine starter motor circuit. With the vehicle engine started, the switch assembly 142, switch rod 144, the lock bolt and the cylinder lock 46 may automatically return as by suitable return spring means to "on" position wherein all vital operating parts of the vehicle are operative.

A further feature of the invention resides in a block-out or prevention of steering column locking and ignition locking in any position of the shift bowl 36 other than "Park" as shown in FIGURE 4. This arises from a blocking engagement obtaining between stop 82 and keeper plate 84 in all positions of the keeper plate except that wherein the alignment is established between the gate 86 and the stop 82. Thus, with the vehicle engine running and the steering shaft and shift tube free to rotate, the same cannot be locked by forced movement by cylinder lock 46 moving stop 82 from "on" or "off" toward "lock" position when the shift tube is in any of the positions "R," "N," "D" or "L." Accordingly, the vehicle must first be brought to a halt and the shift bowl brought to "Park" position realigning the lock bolt 74 with gate 86 whereby the switch rod 144, the lock bolt, the sector 62 and the cylinder lock 46 may be turned to 'lock" or "accessory" positions bringing the stop 82 into registry within the gate, bringing steering shaft bolt 120 to its locked position. This of course renders the cylinder lock 46 to the locking condition thereof permitting withdrawal of key 60.

Referring to FIGURE 8, a modification is shown wherein, in addition to the features of locking only in "park" and prevention of movement to "lock" in all other positions of the shift bowl, there is the additional feature of prevention of movement of the shift bowl lock bolt 74 to "start" during certain conditions. In this construction, an additional stop 160 is provided on lock bolt 74 but of a reduced height, and an additional gate 162 is provided in the keeper plate 84 on the shift bowl of similar reduced height. The gate 162 is located so as to align with the lock bolt 74 when the shift bowl is rotated to "Neutral" position. It is thus seen, referring to FIGURE 3, that the lock bolt 74 may be moved leftwardly from "lock" or "off" to its extreme "start" position when the shift bowl is located in "Park," and additionally may be so moved with the lock bolt initially located in "off" and the shift bowl in "Neutral," by the permitted movement of stop 160 through gate 162. The stop 160 engages keeper plate 84' in all positions of the shift bowl other than "Park" or "Neutral" to prevent the lock bolt and the switch actuating rod 144 from moving downwardly from "off" to "start." This construction may be found an attractive alternative to the conventional "neutral safety switch" of the prior art usually provided to interrupt the starter circuit in all positions of the steering column shift tube except that of "Park" or "Neutral."

Referring to FIGURE 9, a further modification is shown concerning an alternative construction for coordination of the shift bowl lock bolt 74 and the steering shaft lock bolt 120. This construction is generally identical to that described above except for elimination of the cantilever steering shaft bolt spring 124 and the cam 126, as well as the eliminating of the cam projection 132 on the shift bowl. In the instant structure, a fork 170 is provided extending transversely from the major body portion of lock bolt 74' to receive between its legs a reduced diameter portion 172 of the steering shaft lock bolt 120'. A coil compression spring 174 seats between the fork 170 and the upward shoulder of the bolt 120'. The two bolts are thus movable as a unit under actuating rotation of cylinder lock 46 between their respective locked and unlocked positions relative to their respective keeper plates. As with the previous embodiment, it is seen that the steering shaft lock bolt 120' can be moved to locked position with the shift bowl lock bolt 74' by corresponding actuation of the cylinder lock 46, providing that the initial manipulation of moving the shift bowl to "Park" has been accomplished. In this operation, the compression spring 74 of course serves to transfer the movement of the shift bowl lock bolt 74' to the steering shaft lock bolt but, again, assuming the steering wheel is not in proper position to receive the bolt 120' in a notch of its keeper plate, the bolt will accordingly be held by the keeper plate and the spring will be compressed so that the bolt will automatically project under the force of the spring into the keeper plate when the steering wheel is subsequently slightly rotated.

Referring to FIGURES 10 and 11, a modification of the invention is shown as applied for use in a steering column structure provided with a tiltable steering wheel. For the details of such a steering column, reference may be had to Zeigler et al. 3,167,971 issued Feb. 2, 1965, and assigned to the assignee herein. As reproduced in FIGURES 10 and 11, the tilt column structure is basically identical to the standard column previously described herein but further includes a support housing 216 which is securely mounted on the support column 14 as in the manner previously described and which has journaled therein an axially aligned pair of trunnions 218 and 220. The trunnions serve to rotatably mount an upper bearing support 222 of die-cast or similar construction generally similar to the upper portions of the housing 18 of the first embodiment described above. The steering shaft includes lower and upper portions 224 and 226 mounted rotatably in housing 216 and support 222 respectively and joined by a universal connection or joint 228 enabling tiltable movement of the upper bearing support 222, the upper shaft 226 and the vehicle steering wheel about the axis of trunnions 218 and 220 to various selected positions of the steering wheel in a vertical plane.

The steering column lock structure for this type of steering column may be basically identical to that described above, with the actuating cylinder lock being again mounted rotatably in suitable boss means on the bearing support 222 and having a sector provided with gear teeth and cam construction or other means operable to coordinatively shift the steering shaft and shift bowl lock bolts and a switch actuating rod between locked and unlocked positions. To accommodate the tilting movement of the steering wheel and bearing support 222 in those parts of the lock which extend between the bearing support and the housing 216, there is provided a configuration of shift bowl lock bolt such as that shown. The lock bolt assembly, designated generally as 230, includes a rack member 232 centrally apertured at 234 to be closely received slidably over a boss portion 236 of housing 216. The rack member includes the teeth 238 engageable with the actuating sector 62 on the cylinder lock and adjacent its other end, is provided with an arcuate slotted end portion 240 lying generally in a plane perpendicular the axis of trunnions 218 and 220. A locking and actuator member 242 is joined to the slotted end portion 240 by a pin received in the slot of the end portion. Member 242 is suitably constrained as by the plate 78" similar to that previously described for movement only in an axial longitudinal plane of the steering column between a locking position registering a stop portion 244 of member 242 within a gate of the keeepr plate 84" on the shift bowl 46. The rack 232 is permitted to move between the locked and unlocked positions of member 242 through the length of the slot 234. Again, member 232 has suitable connection with a switch actuating rod, not shown, to control the vehicle electrical circuits through shifting movement of the member 232. It will be appreciated that the pin and arcuate slot arrangement on members 238 and 242 allows these members to assume various angular relationships accommodating the tilting movement of the steering wheel without affecting the functions of the steering column lock.

As mentioned, it is believed that the description given above on the steering column lock for use with automatic transmission is sufficient for practice thereof also with transmissions of the manually shifted type. With the latter, it is preferred that the locking and electrical switch elements be generally identically arranged except that the shift bowl lock bolt 74 be registrable with a gate in the keeper plate 84 when the shift bowl is located in "Reverse," and that stop 82 be blocked in all other positions of the transmission. For transmission range selecting arrangements of the "floor mount" type, the functions of the steering column lock may be retained with respect to transmission selector operation by providing a "backdrive"; i.e., the use of a slave shift tube 42 and shift bowl 36 which are rotated on steering column 12 through suitable linkage connecting the floor mounted selector and the shift tube. Alternatively, the relationship and certain parts of the lock operable upon the shift bowl 36 may be eliminated, the locking functions thus being restricted to the steering shaft 26 and switch 142.

Having thus described the invention, what is claimed is:

1. In an automotive vehicle steering column structure including a support column mounted on the vehicle, steering shaft means rotatably mounted within said support column and operatively connected to the vehicle steering gear, and a transmission control member rotatably mounted within said support column and operatively connected with the vehicle power transmission, a steering column lock system comprising, a steering column lock bolt means mounted on said support column for reciprocating movement between locked and unlocked positions in planes extending longitudinally of said support column generally parallel the axis thereof, first lock keeper means fixed to said transmission control member and rotatable therewith in a plane extending generally transverse the axis of said support column, second lock keeper means fixed to said steering shaft means for rotation therewith in a plane extending generally transverse the axis of said support column, said lock bolt means including portions respective to each of said first and second keeper means, said portions of said lock bolt means being registrable simultaneously within the transverse planes of said first and second keeper means upon shifting movement of said lock bolt means form the unlocked to the locked position thereof wherein said lock bolt means are engageable with said first and second keeper means to prevent rotation of said transmission control member and said steering shaft means relative to said support column, and lock control means operatively connected with said lock bolt means for selectively moving the latter between the locked and unlocked positions thereof.

2. The steering column lock system recited in claim 1 further including switch means adapted for connection with and control of the vehicle motor ignition system, said lock control means being operatively connected with said switch means for simultaneous control of said lock bolt means and said switch means.

3. In automotive vehicle steering column structure including a supporting column mounted on the vehicle, steering shaft means rotatably mounted within said support column and operatively connected to the vehicle steering gear, and a transmission control member rotatably mounted within said support column concentrically of said steering shaft means and operatively connected with the vehicle power transmission, a steering column lock system comprising, steering column lock bolt means mounted on said support column for reciprocating movement between locked and unlocked positions in planes extending longitudinally of said support column generally parallel the axis thereof, first lock keeper means fixed to said transmission control member and rotatable therewith in a plane extending generally transverse the axis of said support column, second lock keeper means fixed to said steering shaft means for rotation therewith in a plane extending generally transverse the axis of said support column and spaced from the transverse plane of said first keeper means, said lock bolt means including spaced portions respective to each of said first and second keeper means, said portions of said lock bolt means being registrable simultaneously within the transverse planes of said first and second keeper means upon shifting movement of said lock bolt means from the unlocked to the locked position thereof wherein said lock bolt means are engageable with said first and second keeper means to prevent rotation of said transmission control member and said steering shaft means relative to said support column, switch means located adjacent said lock bolt means and adapted for connection with a vehicle motor ignition system for control thereof, means operatively connecting said lock bolt means with said switch means for actuation of the latter by movement of said lock bolt means between the locked and unlocked positions thereof, and lock control means operatively connected with said lock bolt means for selectively moving the latter between the locked and unlocked positions thereof.

4. A lock for an automotive vehicle steering column assembly having a support column and a control member mounted for rotation within the column, comprising, lock bolt means mounted on said support column for reciprocating movement between locked and unlocked positions in planes extending longitudinally of the support column generally parallel the axis thereof, a keeper plate fixed to the control member for rotation therewith in a plane extending generally transverse the axis of the support column and including a stop receiving gate therein, said lock bolt means including a stop portion registrable within said gate in the transverse plane of said keeper plate only upon reciprocation of said lock bolt means from the unlocked to the locked position thereof coincidentally with rotation of said keeper plate and said control member to a predetermined rotary position thereof relative to said longitudinal planes of said lock bolt means, said registry preventing rotation of said control member relative to said support column, cylinder lock means mounted on said support column to one side of the transverse plane of said keeper plate and movable between locked and unlocked conditions, switch means mounted on said support column to the other side of said transverse plane and adapted for connection with a vehicle ignition system for control thereof, said lock bolt means being located intermediate said switch means and said cylinder lock means, means operatively connecting said lock bolt means and said switch for actuation of the latter upon movement of said lock bolt means from the locked to the unlocked position thereof, said cylinder lock means being operatively connected with said lock bolt means to move the latter between said locked and unlocked positions thereof, said stop portion and said keeper plate being engageable to prevent movement of said cylinder lock means from the unlocked to the locked position thereof and movement of said lock bolt means from the unlocked to the locked position thereof except upon location of said keeper plate with said control member in said predetermined rotary position thereof.

5. In automotive vehicle steering column structure including a supporting column mounted on the vehicle, steering shaft means rotatably mounted within said support column and operatively connected to the vehicle steering gear, and a transmission control member rotatably mounted within said support column concentrically with said steering shaft means and operatively connected with the vehicle power transmission, a lock system comprising, a keeper plate fixed to the transmission control member for rotation therewith in a plane extending generally transverse the axis of said support column, transmission lock bolt means mounted on said support column for reciprocating movement between locked and unlocked positions in a plane extending longitudinally of the support column generally parallel the axis thereof, said keeper plate and said bolt means having gate and stop means thereon registrable by reciprocation of said bolt means in said plane thereof relative to the transverse plane of said keeper plate from the unlocked to the locked position of said bolt means coincidentally with rotation of said keeper plate and said transmission control member to a predetermined rotary position relative to the longitudinal plane of said bolt means, said registry preventing rotation of said transmission control member relative to said support column, a steering shaft lock bolt mounted on said support column for reciprocating movement between locked and unlocked positions in a plane generally parallel the plane of said transmission lock bolt means, steering keeper means fixed to said steering shaft means for rotation therewith in a plane extending generally transverse the axis of said support column and spaced from the transverse plane of said keeper plate, said steering shaft lock bolt being registrable upon movement from the unlocked to the locked position thereof with said steering keeper means to prevent rotation of said steering shaft means, lock means adapted for control of another vital operating part of the vehicle and mounted on said support column for movement between locked and unlocked conditions, means positively operatively connecting said lock means with said transmission lock bolt means to move the latter respectively between said locked and unlocked positions thereof upon said movement of the lock means, and means connecting said transmission lock bolt means with said steering shaft lock bolt for reciprocation of the latter between locked and unlocked positions by and simultaneously with the reciprocation of said transmission lock bolt means between the locked and unlocked positions thereof respectively, said gate and stop means being engageable to prevent movement of said lock means to the locked position thereof and said simultaneous reciprocation of said transmission lock bolt means and said steering shaft lock bolt to the locked position thereof except upon location of said keeper plate with said transmission control member in said predetermined rotary position thereof.

6. The steering column lock system recited in claim 5 wherein said means operatively connecting said transmission lock bolt means with said steering shaft lock bolt include resilient means mounted to said support column and to said steering shaft lock bolt and normally relaxed, cam means on said transmission control member engageable with said resilient means substantially only in said predetermined rotary position to stress said resilient means for bias on said steering shaft lock bolt from the unlocked to the locked position thereof, and bolt control means on said lock means operative to hold said steering shaft lock bolt in the unlocked position thereof against said bias until said lock means is moved to the locked position thereof.

7. A lock for an automotive vehicle steering column assembly having a support column and a transmission control member mounted for rotation within the column, comprising, lock bolt means mounted on said support column for reciprocating movement between locked and unlocked positions in planes extending longitudinally of the support column generally parallel the axis thereof, keeper means fixed to said transmission control member for rotation therewith in a plane extending generally transverse the axis of the support column, said lock bolt means and said keeper means having gate and stop structure thereon registrable by reciprocation of said lock bolt means in said planes thereof relative to the transverse plane of said keeper means from the unlocked to the locked position of said lock bolt means when said transmission control member is located in predetermined rotary position, said registry rendering said gate and stop structure engageable to prevent rotation of said transmission control member from said predetermined position, cylinder lock means mounted on said support column for movement between locked and unlocked conditions, switch structure mounted on said support column including first switch means adapted for connection with a vehicle motor ignition system and second switch means adapted for connection with a vehicle engine starting system, and means positively operatively connecting said cylinder lock means with said lock bolt means and with said switch structure whereby movement of said cylinder lock means from the locked to the unlocked condition thereof moves said lock bolt means from the locked position thereof and actuates successively said first and then said second switch means, said gate and stop structure being engageable to prevent return movement of said cylinder lock means to the locked condition thereof except upon location of said transmission control member in said predetermined rotary position thereof, said gate and stop structure being further engageable to block said movement of said cylinder lock means fully to actuate said second switch means except upon location of said transmission control member in a preselected rotary position.

References Cited

UNITED STATES PATENTS

| | | | |
|---|---|---|---|
| 2,147,613 | 2/1939 | Sandberg | 70—239 |
| 2,679,744 | 6/1954 | Hildebrand | 70—202 |
| 2,724,259 | 11/1955 | Hebert | 70—202 |
| 2,890,581 | 6/1959 | Lewis | 70—248 |
| 3,167,971 | 2/1965 | Zeigler et al. | 74—493 |
| 3,400,563 | 9/1968 | Lempke et al. | 70—184 |

MARVIN A. CHAMPION, Primary Examiner

ROBERT L. WOLFE, Assistant Examiner

U.S. Cl. X.R.

70—239, 248, 422